UNITED STATES PATENT OFFICE.

ERNST BIDTEL, OF GOLCONDA, ILLINOIS, ASSIGNOR TO MORITZ EYSSELL, OF ST. LOUIS, MISSOURI.

PROCESS OF PURIFYING FLUORSPAR.

1,091,795.  Specification of Letters Patent.  Patented Mar. 31, 1914.

No Drawing.  Application filed June 6, 1913.  Serial No. 772,216.

*To all whom it may concern:*

Be it known that I, ERNST BIDTEL, a citizen of the United States, residing at Golconda, Illinois, have invented a certain new and useful Improvement in Processes of Purifying Fluorspar, of which the following is a full, clear, and exact description, such as will enable others skilled in the art to which it appertains to make and use the same.

This invention relates to a process for treating fluorspar so as to remove certain substances that are combined with fluorspar in its natural state and which detract from the value of fluorspar that is used in certain chemical and metallurgical processes.

In all fluorspar deposits the particles of fluorspar are closely associated with gangue matter which fills the interstices of the mass and forms a coating over the particles of fluorspar. It is a comparatively easy matter to separate some of the gangue matter in fluorspar deposits by the milling and concentrating methods now in general use but it is practically impossible to separate the silica and silicates from the particles of fluorspar by milling, jigging or concentrating methods owing to the irregular shape of the particles of fluorspar and to the fact that the specific gravity of the said substances are so nearly the same that gravity cannot be used as a basis in separating them.

The main object of my invention is to provide a practicable process for obtaining fluorspar that analyzes high in calcium fluorid and low in silica.

Another object is to provide a rapid and inexpensive process for treating fluorspar so as to remove the silica and silicates that detract from the commercial value of fluorspar.

Briefly described, my method consists in subjecting fluorspar to the action of a solution of caustic alkali so as to decompose the silica and silicates that are closely associated with the particles of fluorspar and then removing the slime and soluble products that results from this action. The fluorspar can be crushed very fine, but in practice I have found that small particles of fluorspar or fluorspar which has been crushed so that it will pass through an eighth-inch mesh screen can be successfully treated by my process so as to remove practically all of the silica and silicates that detract from the value of the fluorspar for certain commercial purposes. I prefer to subject the fluorspar to the action of the caustic alkali solution under pressure so as to thoroughly distribute the solution through the mass and intensify the chemical reaction between the caustic alkali and the silica, thereby causing the solution to actively attack the coating of silica which incases the particles of fluorspar.

One convenient way of practising my process is to place a mass of small particles of fluorspar in a container, introduce a solution of caustic alkali into the container, and then seal the container. If desired, the solution can be formed in the container by placing the proper amount of carbonate of alkali and caustic lime and water in the container. I prefer, however, to form the solution in a separate vessel and then introduce the solution into the container. Thereafter, the contents of the container is agitated and is subjected to heat so as to cause the solution of caustic alkali to be thoroughly distributed through the mass of fluorspar, the heat causing sufficient pressure to be created in the container to force the solution into direct contact with the particles of fluorspar and intensify the chemical reaction that takes place. The solution decomposes the silica and silicates that are closely associated with the fluorspar, thus completely separating the particles of fluorspar from the substances that detract from the value of fluorspar which is used for certain purposes. The silica and most of the silicates that are decomposed by the action of the caustic alkali solution form compounds soluble in water so that the unsoluble remainder and said compounds which form a fine slime can be easily removed from the fluorspar by washing.

The process above-described not only removes the silica and silicates but it also removes all organic matter (hydrocarbons) which is associated with fluorspar. Consequently the product that results from my process is white fluorspar which analyzes high in calcium fluorid and low in silica.

Any suitable kind of apparatus may be used for practising my process but the apparatus that I prefer to use comprises a closed container and a steam coil which extends through the mass of fluorspar and the solution in the container and thus generates sufficient pressure in the container to cause the solution to actively attack the substances which it is desired to remove.

The strength of the solution and the time that the fluorspar is subjected to the action of the solution will vary according to the grade of the fluorspar. In one test that I made to show the efficiency of my process a mass of crushed fluorspar was treated with a solution of caustic soda containing 35% NaOH under a pressure of 100 lbs. per square inch during a period of four hours.

| Before treatment the fluorspar tested: | | And after treatment it tested: | |
| --- | --- | --- | --- |
| $CaF_2$ | 89.83% | $CaF_2$ | 95.19% |
| $SiO_2$ | 4.75% | $SiO_2$ | 0.60% |
| $CaCO_3$ | 2.46% | $CaCO_3$ | 3.09% |
| $PbS_1ZnS$, $Fe_2O_3Al_2O_3$ | 2.96% | $PbS_1ZnS$, $Fe_2O_3Al_2O_3$ | 1.12% |
| Water and hydrocarbons | | Water | |
| | 100.00 | | 100.00 |

Having thus described my invention, what I claim as new and desire to secure by Letters Patent is:

1. A process for treating fluorspar which consists in subjecting fluorspar to the action of a caustic alkali solution so as to decompose the silica and silicates that are closely associated with the particles of fluorspar, and thereafter removing the soluble products and the slime that result from this action.

2. A process for treating fluorspar which comprises subjecting a mass of fluorspar to the action of a caustic alkali solution under pressure so as to decompose the silica and silicates, that are closely associated with the particles of fluorspar.

3. A process for treating fluorspar which consists in mixing a caustic alkali solution with small particles of fluorspar and agitating the mass so as to thoroughly distribute the solution through the mass and cause it to decompose certain gangue matter that is closely associated with the fluorspar, and thereafter washing the mass so as to separate the fluorspar from the soluble products and the slime that result from the decomposition of the gangue matter.

4. A process for treating fluorspar which comprises mixing a caustic alkali solution with fluorspar and agitating the mass and subjecting it to pressure, thereby causing the solution to actively attack and decompose the silica and silicates that are associated with the fluorspar.

In testimony whereof I hereunto affix my signature in the presence of two witnesses, this fourth day of June, 1913.

ERNST BIDTEL.

Witnesses:
WELLS L. CHURCH,
GEORGE BAKEWELL.